(12) United States Patent
Aalund et al.

(10) Patent No.: US 10,303,574 B1
(45) Date of Patent: May 28, 2019

(54) SELF-GENERATED THERMAL STRESS EVALUATION

(71) Applicant: Amazon Technologies, Inc., Seattle, WA (US)

(72) Inventors: Ryan Jeffrey Aalund, Bellevue, WA (US); Christopher James BeSerra, Federal Way, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 61 days.

(21) Appl. No.: 14/843,937

(22) Filed: Sep. 2, 2015

(51) Int. Cl.
| | |
|---|---|
| *G06F 11/00* | (2006.01) |
| *G06F 11/263* | (2006.01) |
| *G06F 1/20* | (2006.01) |
| *G06F 11/273* | (2006.01) |
| *G05B 15/02* | (2006.01) |
| *G05D 13/62* | (2006.01) |

(52) U.S. Cl.
CPC ............ *G06F 11/263* (2013.01); *G05B 15/02* (2013.01); *G05D 13/62* (2013.01); *G06F 1/206* (2013.01); *G06F 11/273* (2013.01)

(58) Field of Classification Search
CPC .... G06F 1/206; G06F 11/3058; G06F 11/263; G06F 11/273; H05K 7/20836; G05B 15/02
See application file for complete search history.

(56) References Cited

U.S. PATENT DOCUMENTS

| | | | | |
|---|---|---|---|---|
| 4,324,288 A | * | 4/1982 | Karns | F24F 3/001 165/217 |
| 6,340,874 B1 | * | 1/2002 | Vladimir | H05K 7/20209 318/461 |
| 6,442,700 B1 | * | 8/2002 | Cooper | G06F 1/206 713/320 |
| 6,643,128 B2 | * | 11/2003 | Chu | G06F 1/206 318/471 |
| 7,212,926 B2 | * | 5/2007 | Ingalls, Jr. | F01N 11/00 702/184 |
| 7,426,109 B2 | * | 9/2008 | Lindell | H05K 7/20836 361/679.48 |
| 7,502,952 B2 | * | 3/2009 | Chotoku | G06F 1/206 361/695 |

(Continued)

*Primary Examiner* — Elmira Mehrmanesh
(74) *Attorney, Agent, or Firm* — Thomas | Horstemeyer, LLP; Michael J. D'Aurelio; Jason M. Perilla (57) ABSTRACT

Self-generated thermal stress evaluation concepts are described. In one embodiment, a system includes a computing device, a cooling system, such as fans, that draws heat away from the computing device, and a management controller. The management controller can sense a temperature in the computing device and compare it against a temperature profile. The temperature profile can specify one or more target temperatures in the computing device over time. Based on the comparison, the management controller can adjust a cooling capacity of the cooling system. The adjustment to the cooling capacity can be achieved by reducing the speed of the fans, for example, to raise the temperature in the computing device. Processing tasks can also be executed in the computing device and, in response to the detection of an error in the computing device, the management controller can record the error and a profile for the error for further evaluation.

25 Claims, 5 Drawing Sheets

(56) References Cited

U.S. PATENT DOCUMENTS

| | | | | |
|---|---|---|---|---|
| 8,602,092 B2* | 12/2013 | Lenehan | ............... | H01L 23/34 |
| | | | | 165/247 |
| 8,843,771 B2* | 9/2014 | Wang | ............... | H04L 41/00 |
| | | | | 700/299 |
| 9,442,816 B2* | 9/2016 | Cordero | ............... | G06F 11/1658 |
| 9,459,633 B2* | 10/2016 | Geissler | ............... | H05K 7/20836 |
| 9,500,535 B1* | 11/2016 | Urban | ............... | G01K 7/427 |
| 9,727,346 B2* | 8/2017 | Shao | ............... | G06F 1/206 |
| 2002/0109518 A1* | 8/2002 | Saito | ............... | G01R 1/0458 |
| | | | | 324/750.09 |
| 2004/0078676 A1* | 4/2004 | Chi | ............... | G01R 31/319 |
| | | | | 714/33 |
| 2007/0260894 A1* | 11/2007 | Aguilar, Jr. | ............... | G06F 1/206 |
| | | | | 713/300 |
| 2010/0049466 A1* | 2/2010 | Casey | ............... | G06F 11/3058 |
| | | | | 702/130 |
| 2010/0321874 A1* | 12/2010 | Bhattacharyya | ... | H05K 7/20736 |
| | | | | 361/679.5 |
| 2012/0119767 A1* | 5/2012 | Su | ............... | G01R 31/2817 |
| | | | | 324/750.03 |
| 2012/0215359 A1* | 8/2012 | Michael | ............... | G06F 1/206 |
| | | | | 700/275 |
| 2014/0117908 A1* | 5/2014 | Busch | ............... | G06F 1/206 |
| | | | | 318/471 |
| 2015/0118017 A1* | 4/2015 | Yato | ............... | F04D 27/004 |
| | | | | 415/1 |
| 2016/0050789 A1* | 2/2016 | Bhattacharyya | ....... | G05B 15/02 |
| | | | | 700/282 |
| 2016/0081231 A1* | 3/2016 | Berke | ............... | G06F 1/20 |
| | | | | 700/299 |

* cited by examiner

SELF-GENERATED THERMAL STRESS EVALUATION

BACKGROUND

After the manufacture and assembly of a new computing device or system, the computing device is often tested for suitable operation before being deployed. In that context, stress testing can be used to determine the stability of a computing device or system. Among other reasons, stress testing can be used to determine modes of failure, confirm operating specifications, and to assess the limits of stable operation outside normal operating conditions. The goal of stress testing can be to identify modes of failure in a computing device, for example, in an aim to reduce the costs associated with repairs and downtime.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

As noted above, stress testing can be used to determine the stability of a computing device or system. Among other reasons, stress testing can be used to determine modes of failure, confirm operating specifications, and to assess the limits of stable operation outside normal operating conditions. Stress testing may involve testing a computing device beyond its normal operating conditions, such as at high or low temperatures, high or low voltages, or for extended periods of time. For example, reliability engineers often test computing devices under accelerated stress conditions in an effort to identify any latent defects or likely modes of failure.

One way to accelerate stress conditions is to subject a computing device to temperatures higher than those expected under normal operating conditions. For example, one or more computing devices can be placed into a heat chamber and tested during various processing loads in an effort to accelerate any latent defects or likely modes of failure. However, the application of heat as a stress condition can be relatively challenging and costly especially for testing large computing devices or arrangements of computing devices, such as a rack of servers. Further, after a computing device is deployed, it can be difficult to apply heat as a stress condition because it is necessary to relocate the computing device into a heat chamber for testing.

In the context outlined above, various self-generated thermal stress evaluation embodiments and concepts are described. Using the concepts described herein, relatively high heat stress conditions can be achieved and applied to computing devices without the need for a heat chamber or other external heating systems. Instead, by actively managing the heat generated by the computing device itself, the computing device can be tested under higher temperature stress conditions. The management of heat can be controlled by a management controller of the computing device, with reference to one or more temperature profiles.

Figure 1:
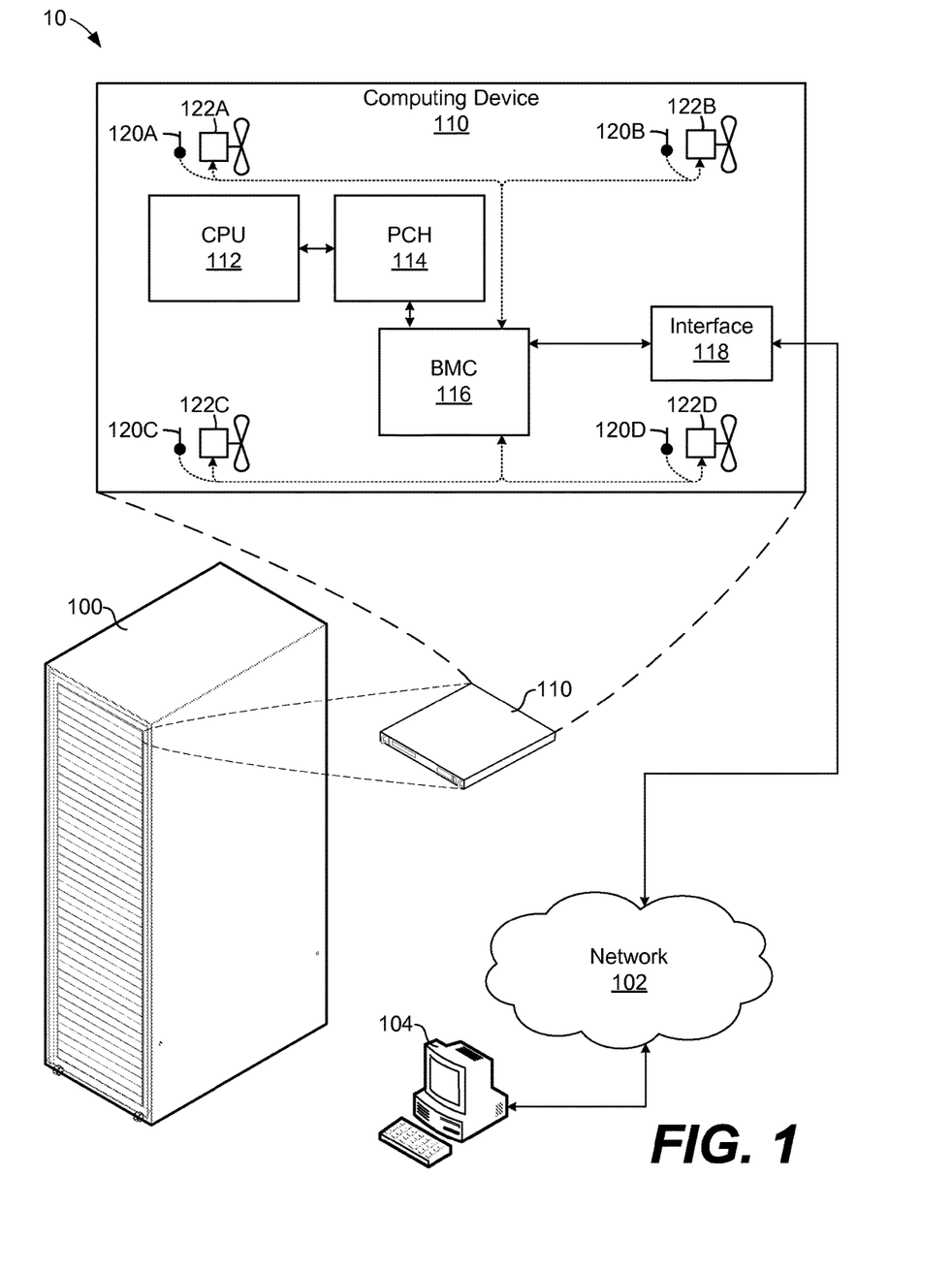
FIG. 1 illustrates a networked environment and computing devices that perform self-generated thermal stress evaluation according to various example embodiments described herein.

As an introduction to aspects of the embodiments, FIG. 1 illustrates a networked environment 10 having a rack 100 of computing devices 110 that perform self-generated thermal stress evaluation, a network 102, and an evaluation client device 104. The rack 100 of computing devices 110 is representative of an example arrangement of rack-mountable computing devices, including the computing devices 110, that can execute instructions to perform various tasks and host various services, without limitation. Although the rack 100 is illustrated as being suitable for mounting server cases that are relatively flat and wide (e.g., rack unit servers), it is noted that the embodiments described herein are not limited in their application to any particular size, type, configuration, or application of computing devices.

One or more of the computing devices 110 are communicatively coupled to the evaluation client device 104 through the network 102. Thus, as described in further detail below, the evaluation client device 104 can communicate with the computing devices 110 in the rack 100 to remotely power up, power down, reboot, configure, test, and monitor, for example, the computing devices 110 using out-of-band management.

In FIG. 1, a representative view of the components of one of the computing devices 110 is provided. As shown, the representative computing device 110 includes a central processing unit (CPU) 112, a platform controller hub (PCH) 114, a baseboard management controller (BMC) 116, a network interface 118, temperature sensors 120A-120D, and a cooling system including fans 122A-122D.

The BMC 116 can control and monitor various aspects of the operation of the computing device 110. For example, the BMC 116 can monitor the temperature in various areas or zones of the computing device 110 using the temperature sensors 120A-120D and control the operating speed of the fans 122A-122D. Further, to actively manage the temperature in the computing device 110, the BMC 116 can load one of several different temperature profiles for reference during control of the operating speed of the fans 122A-122D. Among the temperature profiles available for reference by the computing device 110, the temperature profiles can include several profile steps, including temperature ramp and temperature jump steps, for example, along with associated time durations for the profile steps.

In one embodiment, the evaluation client device 104 can direct the BMC 116 to load one of the temperature profiles as part of a coordinated stress test of the computing device 110. In turn, the BMC 116 can monitor or measure the temperature or temperatures in one or more areas or zones of the computing device 110 using the temperature sensors 120A-120D. The BMC 116 can then compare the temperatures against one or more target temperatures in the temperature profile. Depending upon how the measured temperatures of the computing device compare against the target temperatures in the temperature profile, the BMC 116 can adjust a cooling capacity of the fans 122A-122D. For example, in one embodiment, the BMC 116 can increase or decrease the speed of one or more of the fans 122A-122D. If decreasing the speed, the temperatures in the computing device 110 may rise. The BMC 116 can continue to monitor the temperatures using the temperature sensors 120A-120D until the target temperatures are met. On the other hand, if increasing the speed of the fans 122A-122D, the temperatures in the computing device 110 may fall.

Thus, without the need for a heat chamber or other external heating systems, the computing device 110 can be tested in a self-generated higher heat environment based on active control of the cooling system in the computing device 110. Before, after, and/or during the generation and maintenance of the self-generated higher heat environment, the CPU 112, the BMC 116, and/or other components in the computing device 110 can perform various processing tasks, such as stress test processing tasks, in an attempt to draw out, accelerate, and/or identify any latent defects or likely modes of failure. At the same time, the CPU 112, the BMC 116, and/or other components in the computing device 110 can monitor for errors or conditions that result from errors in the computing device 110, store the errors, and report the errors to the evaluation client device 104 for further evaluation by technicians, for example.

In other aspects, after the detection of an error in one zone in the computing device 110, the BMC 116 can control the fans 122A-122D to create a temperature differential among the zone and another zone in the computing device 110. The temperature differential can result in a lower temperature in the zone where the error was detected but higher temperatures in other zones. Using the differential, the BMC 116 can isolate or segregate out errors in the one zone while still accelerating failures in other zones, until sufficient testing is complete.

As noted above, relatively high heat stress conditions can be created in the computing device 110, even after installation, using the concepts described herein without external heating systems. By actively managing the heat generated by the computing device 110 itself, the computing device 110 can be tested and evaluated under higher temperature stress conditions.

Figure 2:
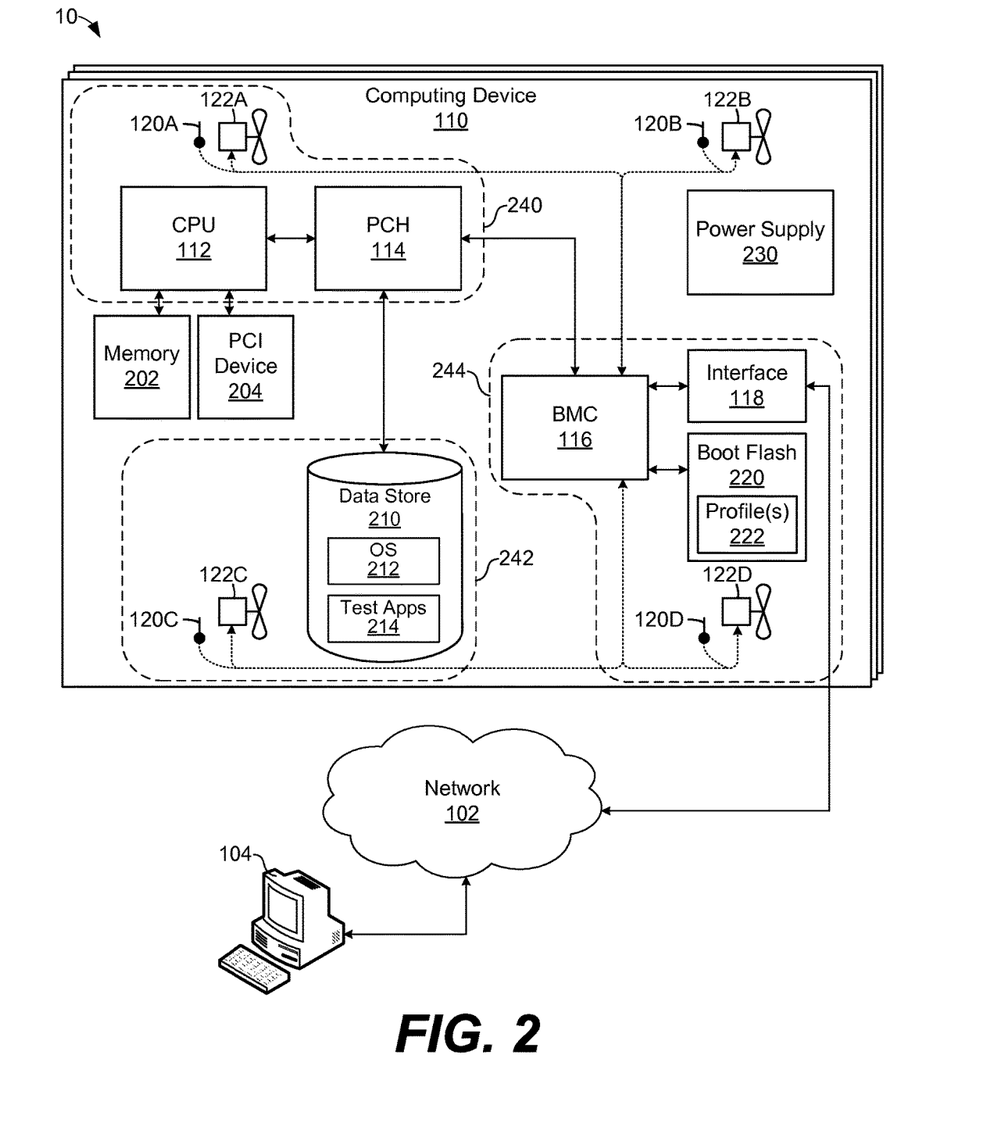
FIG. 2 further illustrates the networked environment and a representative one of the computing devices in FIG. 1 according to various example embodiments described herein.

A more detailed description of the individual components in the networked environment 10 and the operation of the same is provided below with reference to FIG. 2. FIG. 2 further illustrates the networked environment 10 and the representative computing device 110 in FIG. 1. As shown, among other components or subsystems (including those shown in FIG. 1), the computing device 110 further includes memory 202 and a peripheral component interconnect (PCI) device 204 coupled to the CPU 112, a data store 210 coupled to the PCH 114, a boot flash 220 coupled to the BMC 116, and a power supply 230. The components of the computing device 110 can be mounted on and electrically and communicatively coupled to each other by traces on a printed circuit board, such as a mainboard, system board, or motherboard.

Before turning to a more detailed description of the computing device 110, it is noted that the computing device 110 is provided as one representative example of a device in which self-generated thermal stress evaluation can be used for testing. In other words, the concepts described herein can be applied to computing devices other than the computing device 110, such as those embodied in the form of a desktop computer, a laptop computer, a television, a tablet computer, a cellular telephone, a media player, or a set-top box, among others, without limitation.

The CPU 112 can be embodied as any number of general- or specific-purpose processors, processing circuits, processing modules, etc. capable of performing or executing logical operations on data, logic signals, or both. For example, among other types of processors, the CPU 112 can be a complex or reduced instruction set processor, a digital signal processor, system on chip (SoC) processor, embedded processor, or other type of processor, without limitation. Among other integrated subsystem controllers, the CPU 112 can include a memory controller to interface with the memory 202 and a PCI controller to interface with the PCI devices 204. In other embodiments, however, the CPU 112 can omit one or both of those controllers, for example, depending upon the architecture of the computing device 110. It is also noted that the execution of the logical operations in the CPU 112 can be directed, at least in part, according to the execution of instructions placed in the memory 202 for execution.

The PCH 114 can be embodied as any suitable controller hub that coordinates the communication of data and logic signals among various local interfaces in the computing device 110. In that context, among other interfaces, the PCH 114 can incorporate a direct media interface (DMI) and a flexible display interface (FDI) for transfer of data between the CPU 112, the PCH 114, the data store 210, and other peripherals and peripheral subsystems of the computing device 110. The PCH 114 can also incorporate circuitry for clocking and timing functions for the computing device 110, among other circuitry.

The BMC 116 can be embodied as a special-purpose processor, processing circuit, processing module, controller, etc. The BMC 116 can be embodied in a single chip package and mounted to the mainboard of the computing device 110 in any suitable manner and location. The BMC 116 can also be embodied as a platform of integrated circuit chip packages mounted to the mainboard of the computing device 110 in distributed arrangement. In other embodiments, the BMC 116 can be added to or installed in the computing device 110 as a separate peripheral device. In that case, the BMC 116 can be interfaced through a PCI, universal serial bus (USB), or other system or local interconnect interface of the computing device 110.

In one embodiment, the BMC 116 can be part of the intelligent platform management interface (IPMI) of the computing device 110. The BMC 116 manages and monitors the operation and interaction between system software executing on the CPU 112, for example, and the hardware platform of the computing device 110. In that context, various types of sensors, such as the temperature sensors 120A-120D, can be used to measure parameters, such as temperatures, fan speeds, voltages, power statuses, operating system statuses, fault and halt conditions, timeout conditions, etc. The BMC 116 monitors the hardware platform, stores data representative of the measured parameters in the boot flash 220, and sends alerts through the network 102. For example, if any of the measured parameters stray outside predetermined ranges or limits, which can indicate a failure or potential failure, the BMC 116 can send an alert to the evaluation client device 104 through the network 102. The BMC 116 can also remotely power up, power down, reboot, and configure the computing device 110 using out-of-band instructions sent by the evaluation client device 104 through the network 102. It is also noted that the BMC 116 can be embodied as a group of controllers, including a master controller and one or more satellite controllers distributed among the computing device 110, as part of a larger platform management subsystem of the computing device 110.

The network interface 118 can be embodied as any suitable network interface including physical layer receiver and transmitter drivers to communicate data over the network 102, regardless of the protocol used. In the embodiment shown in FIGS. 1 and 2, the network interface 118 is dedicated for use by the BMC 116. In other embodiments, the PCH 114 and the BMC 116 can share the network interface 118. The computing device 110 can also incorporate additional network interfaces, including one or more network interfaces dedicated for use by and communicatively coupled to the PCH 114 using a PCI interface, for example.

The temperature sensors 120A-120D can be embodied as any suitable temperature sensors that measure the temperature in, on, or around components of the computing device 110. For example, the temperature sensors 120A-120D can be embodied as any combination of resistance temperature detectors (RTDs), thermistors, temperature probes, or other temperature sensors, however packaged and mounted in the computing device 110. The computing device 110 can include any number of temperature sensors placed at any location to measure heat in one or more zones or locations in the computing device 110.

In FIG. 2, three zones or areas 240, 242, and 244 are illustrated in the computing device 110. As shown, the temperature sensor 120A can be used to measure or estimate an approximate temperature of the zone 240 associated with the CPU 112 and the PCH 114. Similarly, the temperature sensor 120C can be used to measure or estimate an approximate temperature of the zone 242 associated with the data store 210, and the temperature sensor 120D can be used to measure or estimate an approximate temperature of the zone 244 associated with the BMC 116, the interface 118, and the boot flash 220. Finally, rather than being used to measure the temperature in a zone, the sensor 120C can be used to measure the temperature of one or more parts of the power supply 230, such as switching transistors in a switching power supply, for example. Beyond the temperature sensors 120A-120D, the computing device 110 can include any number of additional temperature sensors to measure the temperature of other zones and/or components in the computing device 110, including integrated temperature sensors in the CPU 112 and the PCH 114, for example.

It should be appreciated that the components of the computing device 110 are not perfectly efficient and radiate waste heat during operation. Unless that heat is removed, the temperature of the computing device 110 can rise to levels unsuitable for extended operation. Thus, the computing device 110 includes a cooling system to remove heat from the computing device 110. The cooling system can include a combination of passive (e.g., heat sinks, heat pipes, etc.) and active (e.g., fans, water pumps, etc.) cooling systems and devices. As one example of the cooling system for the computing device 110, each of the fans 122A-122D can be embodied as any suitable type and size of fan that draws cool air and expels heated air away from the computing device 110. In that context, the computing device 110 can include any number of fans placed at any suitable location to draw waste heat away from the computing device 110. As other examples, the cooling system can include piezoelectric air pumps, liquid cooling systems with pumps, Peltier coolers, or phase-change coolers, among other types of cooling devices. The cooling system can include any combination of the passive and active cooling devices described herein. With regard to actively managing the heat generated by the computing device 110, the BMC 116 can control any of the active cooling devices described herein by the adjustment of active duty cycles, applied voltages or currents, pulse width modulation, or any other suitable techniques.

The memory 202 can be embodied as any suitable type and amount of random access memory (RAM), such as volatile SRAM or DRAM memory modules, non-volatile MRAM memory modules, or other types of memory modules or combinations thereof. Among other devices, the PCI device 204 can be embodied as a video, sound, communications, systems interconnect, or other device.

Among embodiments, the data store 210 can be embodied as any suitable device, structure, or other memory device that stores data, such as a magnetic disk drive, a solid-state or semiconductor (e.g., floating gate, magnetoresistance, etc.) drive, an optical, magnetic, or other computer-readable medium, or any combination thereof, without limitation. As shown in FIG. 2, the data store 210 stores an operating system (OS) 212 and test applications 214.

The operating system 212 can include system software that, when executed by the CPU 112, direct the CPU 112 to manage and execute processes and applications running on the computing device 110. In that context, the OS 212 can direct the CPU 112 to manage the resources of the computing device 110, such as the memory 202, and interfaces for other applications to access those resources. The OS 212 can also direct the CPU 112 to perform basic tasks such as controlling and allocating the memory 202, prioritizing system requests, controlling input and output devices, facilitating networking and managing files systems, etc.

The test applications 214 can include various applications that, when executed by the CPU 112, direct the CPU 112 to test the operation of certain subsystems of the computing device 110. For example, among others, the test applications 214 can include CPU processing stress tests to test the operation of the CPU 112, memory stress tests to test the operation of the memory 202, video graphics stress tests to test the operation of the PCI device 204, data storage stress tests to test the operation of the data store 210, and input/output (I/O) tests to test the operation of one or more local interfaces and/or network interfaces. Further, the test applications 214 can include various scripts to control or direct the sequence, time duration, and operation of the CPU, memory, video graphics, and data storage stress tests, for example. In some cases, one or more of the test applications 214 can be executed at a duty cycle or on/off ratio specifically for the purpose of raising the temperature in the computing device 110. For example, if isolating the memory 202 for testing, a combination of CPU processing, video graphics, and data storage stress tests can be executed at a certain duty cycle, without testing the memory 202. In that case, the CPU processing, video graphics, and data storage stress tests can be relied upon, in part, to heat the computing device 110 to a target temperature for testing the memory 202.

To actively manage heat in the computing device 110, the scripts can also include instructions to communicate in-band instructions from the PCH 114, for example, to the BMC 116. That is, the scripts can direct the BMC 116 to load temperature profiles for testing the computing device 110 in a self-generated higher heat environment based on active control of the cooling system. Further, the scripts can include instructions to record, organize, and report on the ongoing status of errors identified during the stress tests.

The boot flash 220 can be embodied as any type of memory device suitable to store instructions that, when executed, direct the operation of the BMC 116, such as a non-volatile solid-state or semiconductor (e.g., floating gate, magnetoresistance, etc.) memory module, for example. In that context, the boot flash 220 stores instructions that, when executed by the BMC 116, direct the BMC 116 to manage and monitor the operation and interaction between system software executing on the CPU 112, for example, and the hardware platform of the computing device 110. The boot flash 220 also stores one or more temperature profiles for reference by the BMC 116 during the active management of the cooling system in the computing device 110. At any time, the BMC 116 can be directed to receive, store, and load one or more of the temperature profiles 222 and actively manage heat according to one or more of the temperature profiles 222, according to in-band instructions received from the PCH 114, out-of-band instructions received from the evaluation client device 104, or both. Additionally, the boot flash 220 can store status logs associated by the operation of the hardware platform of the computing device 110 over time, as directed by the BMC 116, for reference by the evaluation client device 104.

The components in the computing device 110 are electrically and communicatively coupled together using various types of local interfaces, such as one or more inter-integrated circuit (I²C) interfaces, serial peripheral interfaces (SPI), low pin count (LPC) interfaces, reduced gigabit media-independent interfaces (RGMII), system management bus (SMBUS) interfaces, PCI interfaces, USB interfaces, serial advanced technology attachment (SATA) interfaces, etc. Further, the components in the computing device 110 are capable of communicating with each other using any suitable protocols over the local interfaces. In that context, the BMC 116 can communicate according to the interfaces and protocols defined by the IPMI specification, which includes standardized interfaces and protocols for the platform management subsystem of the computing device 110. For example, the PCH 114 and any satellite controllers of the BMC 116 can communicate with the BMC 116 using IPMI messages through an intelligent platform management bus or bridge (IPMB) using an I²C, SPI, LPC, or other interface. The BMC 116 can also communicate with a BMC in another computing device through an intelligent platform management controller (IPMC) bus or bridge. Further, the BMC 116 can be directed, at least in part, according to remote management control protocol (RMCP) instructions received from the evaluation client device 104 over the network 102, for example.

Generally, the IPMI specification defines an interface for messaging and alerting through IPMI over serial, IPMI over local area network (LAN), and serial over LAN (SOL) interface connections, among others. Thus, IPMI can be used to provide administrators with remote access to manage the computing device 110, even before the OS 212 has been installed. The standard also defines an alerting mechanism for the computing device 110 to generate and send a simple network management protocol (SNMP) platform event trap (PET), for example, or other type of message when certain conditions occur. As such, IPMI messaging can be used to query the status of the computing device 110, review status logs, or issue other commands or requests from the evaluation client device 104. In some embodiments, IPMI alerting functions can be managed by software, such as the test applications 214, running under the OS 212. In that case, the computing device 110 provides in-band (e.g., OS-present) integration with IPMI management functions.

The network 102 can include the Internet, intranets, extranets, wide area networks (WANs), local area networks (LANs), wired networks, wireless (e.g., cellular, 802.11-based (WiFi), bluetooth, etc.) networks, cable networks, satellite networks, other suitable networks, or any combinations thereof. Although not illustrated, the network 102 can include connections to any number of network hosts, such as website servers, file servers, networked computing resources, databases, data stores, or any other network or computing architectures.

The evaluation client device 104 is representative of one or more client devices that may be relied upon by an administrator to query the status of the computing device 110, receive operating status and alert messages from, review status logs of, or issue commands or requests to the computing device 110. The evaluation client device 104 may be embodied as any type of computing device, processing circuit, or processor-based device or system, including those embodied in the form of a desktop computer, a laptop computer, a personal digital assistant, a cellular telephone, or a tablet computer, among others.

Figure 3A:
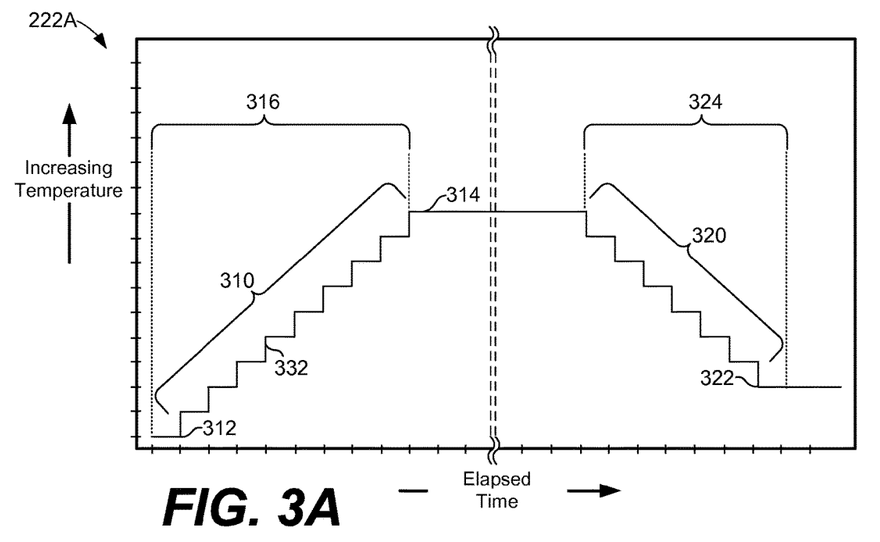
FIGS. 3A and 3B illustrate representative examples of temperature profiles for the representative computing device in FIG. 2 according to various example embodiments described herein.
Figure 3B:
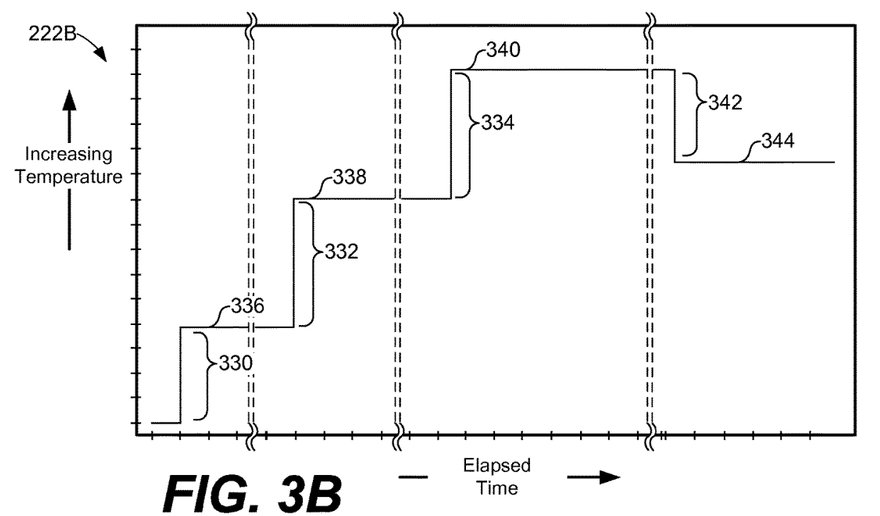

Turning to the examples of the temperature profiles 222, FIG. 3A illustrates a representative example of a temperature profile 222A, and FIG. 3B illustrates a representative example of a temperature profile 222B. In the temperature profiles 222A and 222B, the vertical axis is representative of temperature in the computing device 110, and the horizontal axis is representative of time. The units of temperature and time in the temperature profiles 222A and 222B can be any standard absolute or relative units, abstract units, or any combination thereof, without limitation.

As shown in FIG. 3A, the temperature profile 222A includes two profile steps, including a temperature ramp-up 310 from a first, lower target temperature 312 to a second, higher temperature 314 over a first duration of time 316, and a temperature ramp-down 320 from the second temperature 314 to a lower, third temperature 322 over a second duration of time 324. According to the temperature profile 222A, the temperature 314 is maintained for a predetermined soak time. The soak time can last for any suitable period of time for testing, such as more or less than 4, 8, 12, or 24 hours, for example. In one embodiment, the ramp-up 310 is composed of a number of smaller, individual temperature steps, such as the profile step 332, that carry for predetermined periods of time before proceeding to the next target step.

Further, as shown in FIG. 3B, the temperature profile 222B includes several profile steps, including temperature jump-ups 330, 332, and 334, to target temperatures 336, 338, and 340, respectively. The target temperatures 336, 338, and 340 are each maintained for a suitable period of soak time, as shown in FIG. 3B, such as more or less than 4, 8, 12, or 24 hours, for example. The temperature profile 222B also includes a temperature jump-down 342 to a target temperature 344.

The temperature profiles 222A and 222B are provided by way of example of the temperature ramps, jumps, and other variations that can be defined or specified over time using temperature profiles, but are not intended to be limiting as to the manner or type of variations that are possible. The temperature ramps and jumps and the time periods can be greater or smaller than the representative ones shown in FIGS. 3A and 3B. Thus, a temperature profile can include a temperature jump from a nominal or room temperature to a maximum temperature for testing, followed by a suitable period of soak time at the maximum temperature, and further followed by a temperature jump back down to the lowest possible temperature. This sequence of temperature jump-up, soak time, and jump-down can be repeated any number of times. Further, in one temperature profile, any combination of up and down temperature ramps, jumps, and other features, at any desirable differences in temperature, can be arranged over any suitable period of time for testing. Also, one or more temperature profiles can define separate temperatures for individual components of or zones in the computing device 110, to create variations in temperatures among areas in the computing device 110.

The temperature profiles 222A and 222B (and other temperature profiles) can be stored in the boot flash 220, as described above, and referenced by the BMC 116 to adjust a cooling capacity of the cooling system of the computing device 110. In that sense, the BMC 116 can adjust the cooling capacity in an effort to meet the target temperatures specified in one or both of the temperature profiles 222A and 222B over time. In other words, to raise temperatures in the computing device 110, the BMC 116 can throttle back or decrease the cooling capacity of the cooling system by decreasing the fan speeds of one or more of the fans 122A-122D. On the other hand, to lower temperatures in the computing device 110, the BMC 116 can throttle up or increase the cooling capacity of the cooling system by increasing the fan speeds of one or more of the fans 122A-122D. At the same time, the BMC 116 can sense temperatures in the computing device 110 using the temperature sensors 120A-120D to determine how close the temperatures are to the target temperatures. In some cases, the temperature profiles 222A can include and/or the BMC 116 can evaluate a level of hysteresis when comparing measured and target temperatures, to help stabilize the active control of the cooling system.

At any time before, after, or while the BMC 116 is actively managing the cooling system with reference to the temperature profiles 222A and 222B, the CPU 112, the BMC 116, or both can conduct tests and monitor the operation of the hardware platform in the computing device 110. In that regard, an example process of self-generated thermal stress evaluation is described below with reference to FIGS. 4A and 4B.

Figure 4A:
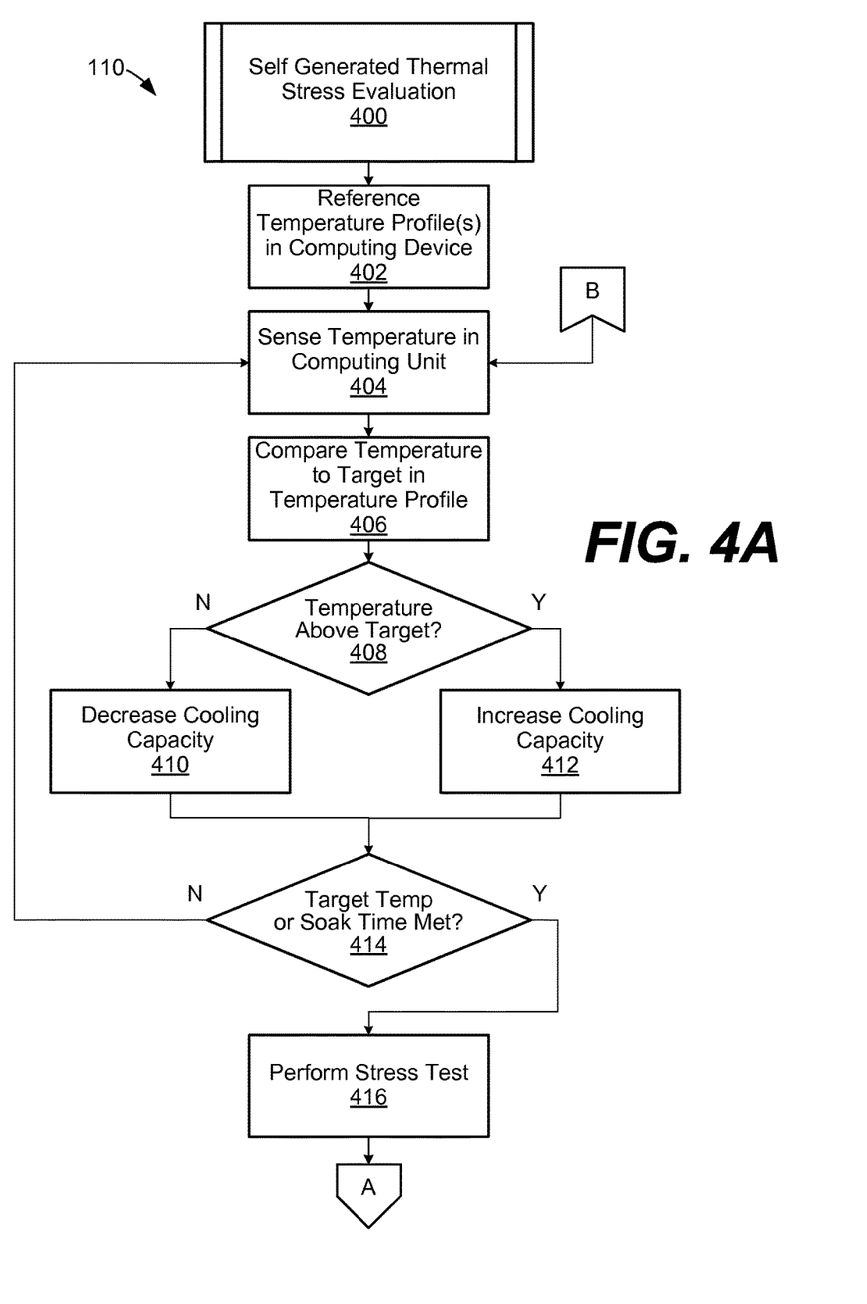
FIGS. 4A and 4B illustrate a process of self-generated thermal stress evaluation performed by the computing device shown in FIGS. 1 and 2 according to an example embodiment described herein.
Figure 4B:
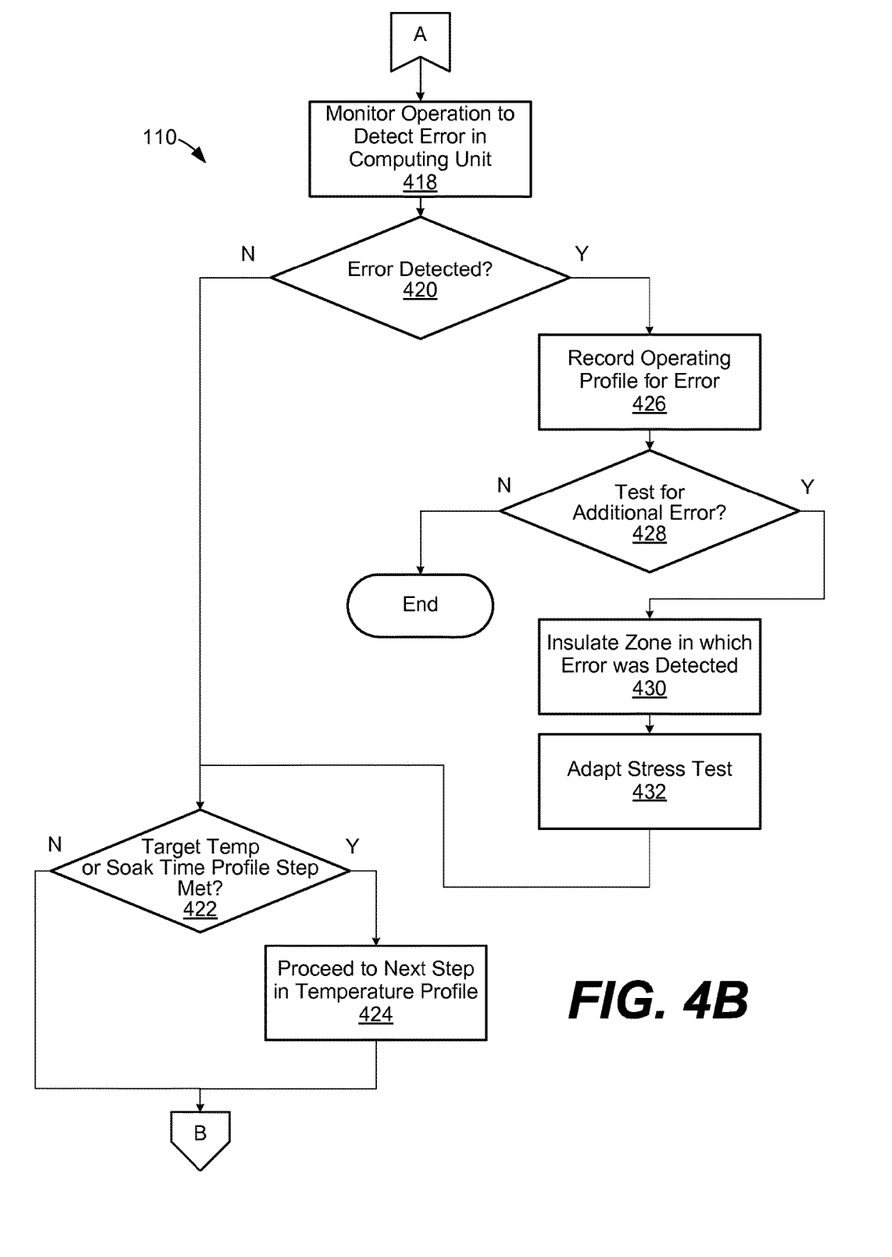

FIGS. 4A and 4B illustrate a process 400 of self-generated thermal stress evaluation performed by the computing device 110 shown in FIGS. 1 and 2 according to an example embodiment described herein. The process flowchart in FIGS. 4A and 4B can be viewed as depicting an example set of steps performed in the computing device 110, according to one or more embodiments. The flowchart in FIGS. 4A and 4B provides merely one example of a functional sequence or arrangement of steps that can be employed to implement the operations of self-generated thermal stress evaluation described herein. Further, although the process 400 is described in connection with the computing device 110, other computing devices can perform the process 400.

At reference numeral 402, the process 400 includes the BMC 116 referencing one or more temperature profiles, such as the temperature profiles 222A and 222B, from the profiles 222 in the boot flash 220. As necessary, the process at reference numeral 402 can also include the BMC 116 receiving one or more temperature profiles, for example, from the evaluation client device 104, the OS 212 or the test applications 214 executing on the CPU 112, or both. If received, the temperature profiles can be stored in the boot flash 220 for reference.

At reference numeral 404, the process 400 includes the BMC 116 sensing one or more temperatures in the computing device 110 using one or more of the temperature sensors 122A-122D or other temperature sensors in the computing device 110, such as integrated temperature sensors in the CPU 112 and/or the PCH 114. The temperatures can be sensed or measured in any suitable absolute or relative unit of measure.

At reference numeral 406, the process 400 includes the BMC 116 comparing the one or more temperatures sensed at reference numeral 404 against any target temperatures specified in the temperature profile or profiles referenced at reference numeral 402. Before comparing, the BMC 116 can generate an average or weighted average of the sensed temperatures for the comparison. Additionally or alternatively, the BMC 116 can compare the respective temperatures measured using one or more of the temperature sensors 122A-122D with respective target temperatures defined in the temperature profile or profiles.

At reference numeral 408, the process 400 includes determining whether the sensed temperatures are above, below, or at the target temperature or temperatures defined in the temperature profile or profiles. If below, then the process 400 proceeds to reference numeral 410. On the other hand, if above, then the process proceeds to reference numeral 412. If the sensed temperatures are at the target temperature or temperatures, then the process may proceed to either reference numeral 412 or 414 or proceed directly to reference numeral 414. Additionally, because the BMC 116 can evaluate a level of hysteresis when comparing sensed and target temperatures, the BMC 116 might not recognize a sensed temperature as being above a specified target temperature unless the sensed temperature is more than a predetermined amount above the target temperature. Likewise, the BMC 116 might not recognize a sensed temperature as being below a specified target temperature unless the sensed temperature is more than a predetermined amount below the target temperature.

At reference numeral 410, the process 400 includes the BMC 116 decreasing the cooling capacity of the cooling system of the computing device 110. For example, the BMC 116 can throttle back or decrease the cooling capacity of the cooling system by decreasing the fan speeds of one or more of the fans 122A-122D. The BMC 116 can also control any other active cooling devices of the cooling system of the computing device 110 by the adjustment of active duty cycles, applied voltages or currents, pulse width modulation, or any other suitable techniques. Additionally, if measured temperatures do not reach target temperatures within a predetermined period of time despite the reduction of cooling capacity, the process 400 can include the BMC 116 storing or recording that condition in the status log for the computing device 110 (e.g., in the boot flash 220) and sending an associated alert message to the evaluation client device 104.

On the other hand, at reference numeral 412, the process 400 includes the BMC 116 increasing the cooling capacity of the cooling system of the computing device 110. For example, the BMC 116 can throttle up or increase the cooling capacity of the cooling system by increasing the fan speeds of one or more of the fans 122A-122D. The BMC 116 can also control any other active cooling devices of the cooling system of the computing device 110 by the adjustment of active duty cycles, applied voltages or currents, pulse width modulation, or any other suitable techniques. Additionally, if measured temperatures continue to rise above target temperatures for more than a predetermined period of time despite the increased cooling capacity, the process 400 can include the BMC 116 logging that condition in the status log of the boot flash 220 and sending an associated alert message to the evaluation client device 104.

At reference numeral 414, the process 400 includes determining whether a target temperature, a target soak time, or both a target temperature and soak time have been met. The target temperature and/or target soak time can be defined in the temperature profile or profiles referenced at reference numeral 402, for example. If the condition is met, the process 400 proceeds to reference numeral 416. Otherwise, the process 400 proceeds back to reference numeral 404 to continue to sense temperatures in the computing device 110. It is noted that, in the example of the process 400 shown in FIG. 4, stress testing starts at reference numeral 416 after a target temperature and/or soak time has been met. However, in other embodiments, stress testing can begin at any time, regardless of whether any target temperatures have yet to be reached and, in some cases, before any temperature profile is even referenced by the BMC 116.

At reference numeral 416, the process 400 includes performing at least one processing task in the computing device 110 to test the operation of the computing device 110. For example the at least one processing task can include CPU processing stress tests to test the operation of the CPU 112, memory stress tests to test the operation of the memory 202, video graphics stress tests to test the operation of the PCI device 204, data storage stress tests to test the operation of the data store 210, and I/O tests to test the operation of one or more local interfaces in the computing device 110 and/or the network interface 118, among other tests.

Referring to FIG. 4B, at reference numeral 418, the process 400 includes the CPU 112, the BMC 116, or both monitoring the operation of the computing device 110 while performing the processing task or tasks at reference numeral 416 to detect an error in the computing device. Among others, examples of errors that can be detected include input/output fault errors, PCI device errors, memory or memory module errors, bus or local interface timeout errors, processor halt errors, power supply undervoltage or overvoltage errors, drive fault errors, etc.

If no error is detected (or yet detected) from reference numeral 420, the process 400 proceeds to reference numeral 422. At reference numeral 422, the process 400 includes the BMC 116 determining whether a target temperature profile step, a target soak time profile step, or both a target temperature and soak time profile step have been met. For example, the BMC 116 can determine whether the target temperature 336 has been reached in the computing device 110 for the period of time specified in the temperature profile 222B. If so, then the process 400 proceeds to reference numeral 424. Otherwise, if not, then the process 400 proceeds back to reference numeral 404 in FIG. 4A.

At reference numeral 424, the process 400 includes the BMC 116 proceeding to a next profile step. For example, the BMC 116 can proceed to the profile step associated with the target temperature 338 in the temperature profile 222B. Thus, when the process 400 proceeds back to reference numeral 404 in FIG. 4A, the BMC 116 will actively manage the cooling system to reach the target temperature 338. In this way, over time, the BMC 116 can proceed through a sequence of profile steps in one or more temperature profiles, such as the temperature profiles 222A and 222B in FIGS. 3A and 3B, for example.

Referring back to reference numeral 420, if an error is detected, the process 400 proceeds to reference numeral 426. At reference numeral 426, the process 400 includes the BMC 116 generating and recording an operating profile for the computing device 110 associated with the error. The operating profile can include any values representative of the operating conditions of the hardware platform of the computing device 110 at or about when the error was detected. The operating profile can be stored or recorded in the status log for the computing device 110 (e.g., in the boot flash 220). Further, at reference numeral 426, the process 400 can also include the BMC 116 generating and sending an alert message associated with the error to the evaluation client device 104.

At reference numeral 428, the process 400 includes determining whether to test for additional errors. For example, depending upon the types and/or sequences of stress testing started at reference numeral 416, the process 400 can run until the first error is detected or proceed to run, if possible, until multiple errors are detected. If no additional errors are to be tested for, the process 400 proceeds to end from reference numeral 428. Otherwise, if additional errors are to be tested for, the process 400 proceeds to reference numerals 430 and 432.

At reference numeral 430, the process 400 includes the BMC 116 insulating or isolating the component in the computing device 110 associated with the error detected at reference numeral 420. For example, if an error with the operation of the data store 210 is detected, the BMC 116 can attempt to cool or insulate the zone 242 as compared to the other zones 240 and 244. In that context, the BMC 116 can increase the fan speed of the fan 122C while decreasing the fan speeds of the fans 122A and 122D, for example. In some cases, by doing so, the BMC 116 can achieve a temperature differential between the zone 242 and the zones 240 and 244. That temperature differential can be sufficient to mitigate any further occurrences of errors in the data store 210, so that further testing of the computing device 110 can proceed. In other words, the BMC 116 can be directed to detect a first error in a first zone of the computing device 110 and, after making active cooling adjustments, proceed with further testing to monitor for a second error in a second zone of the computing device 110.

At reference numeral 432, the process 400 includes the CPU 112, the BMC 116, or both adapting the stress tests being performed. For example, if errors have already been detected in the data store 210, further testing of the data store 210 can be halted. Similarly, if errors in the memory 202 were detected at reference numeral 420, and the zone 240 isolated at reference numeral 430, memory testing can be halted.

The process 400 can proceed to detect various errors, isolating errors in certain components or zones in the computing device 110, if possible, until a complete test is performed. In some cases, one or both of the insulating and adapting at reference numerals 430 and 432 can be omitted, for example, if further testing of the computing device 110 can proceed without adjusting the temperature among zones or testing.

Thus, using the process 400, the computing device 110 can be tested in a self-generated higher heat environment without the need for a heat chamber or other external heating systems. In the higher heat environment, the CPU 112, the BMC 116, and/or other components in the computing device 110 can perform various processing tasks, such as stress test processing tasks, in an attempt to draw out, accelerate, and/or identify any latent defects or likely modes of failure. At the same time, the CPU 112, the BMC 116, or both can monitor for errors or conditions that result from errors in the computing device 110, store the errors, and report the errors to the evaluation client device 104 for further evaluation.

Additionally, the process 400 can be performed in any sequence or concurrently among several computing devices, such as one or more of the computing devices 110 in the rack 100 shown in FIG. 1. It is noted that, because a computing device 110 at the top of the rack 100 may experience higher heat conditions as compared to one at the bottom of the rack 100 (e.g., due to natural convection of waste heat), the sequence of testing and proceeding through profile steps in temperature profiles may unfold at different timings and rates among the computing devices 110 in the rack 100. In other words, if a the computing device 110 at the top of the rack 100 experiences a temperature that rises faster than another computing device 110 at the top of the rack 100, the sequence of testing for the computing device 110 at the top may progress more quickly in time as compared to that for the computing device 110 at the bottom. This may result in the computing device 110 at the top of the rack 100, for example, executing different tests, at different times, as compared to the computing device 110 the bottom of the rack 100.

Among the embodiments, any instructions, processes, or tests implemented in the form of software can be embodied as, for example, C, C++, C#, Objective C, JAVA®, JAVASCRIPT®, Perl, PHP, VISUAL BASIC®, PYTHON®, RUBY, FLASH®, or other programming languages or scripts.

As discussed above, in various embodiments, the memory 202 and the data store 210 store software for execution by the CPU 112, and the boot flash 220 stores software for execution by the BMC 116. In this respect, the terms "executable" or "for execution" refer to software forms that can ultimately be run or executed by the CPU 112 and the BMC 116, whether in source, object, machine, or other form. Examples of executable programs include, for example, a compiled program that can be translated into a machine code format for execution by the CPU 112 and/or the BMC 116, source code that can be expressed in an object code format for execution by the CPU 112 and/or the BMC 116, or source code that can be interpreted by another executable program to generate instructions for execution by the CPU 112 and/or the BMC 116.

The flowchart or process diagrams in FIGS. 3A and 3B are representative of certain processes, functionality, and operations of the embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions executable by a suitable execution system, such as the CPU 112 and/or the BMC 116. The machine code can be converted from the source code, etc. Further, each block can represent, or be connected with, a circuit or a number of interconnected circuits to implement a certain logical function or process step.

Although the flowchart or process diagrams in FIGS. 3A and 3B illustrate a certain order or flow, it is understood that the order can differ from that which is depicted. For example, an order of execution of two or more blocks can be scrambled relative to the order shown. Also, two or more blocks shown in succession in FIGS. 3A and 3B can be executed concurrently or with partial concurrence. Further, in some embodiments, one or more of the blocks shown in FIGS. 3A and 3B can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Disjunctive language, such as the phrase "at least one of X, Y, or Z," unless specifically stated otherwise, is to be understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments are merely examples to set forth an understanding of the principles and concepts of the disclosure. Many variations and modifications can be made to the above-described embodiment(s) without departing substantially from the spirit and principles of the disclosure. All such modifications and variations are intended to be included herein within the scope of this disclosure and protected by the following claims.

Therefore, at least the following is claimed:

1. A non-transitory computer-readable medium embodying at least one program that, when executed in a computing device, directs the computing device to perform a method comprising:
    sensing a temperature in at least one zone of the computing device;
    comparing the temperature over time against a target temperature defined in a temperature profile for stress testing the computing device, the temperature profile comprising a plurality of profile steps, at least one of the plurality of profile steps specifying the target temperature over a duration of time;
    adjusting a fan speed of at least one fan among a plurality of fans in the computing device in an effort to meet the target temperature based at least in part on the comparing;
    performing at least one processing task in the computing device;
    monitoring operation of the computing device while performing the at least one processing task to detect a first error in a first zone of the computing device; and
    in response to detection of the first error in the first zone of the computing device:
        recording the first error and an operating profile associated with the computing device for the first error;
        adjusting a fan speed of at least one other fan among the plurality of fans in the computing device to create a temperature differential between the first zone of the computing device and a second zone of the computing device; and
        monitoring operation of the computing device while performing the at least one processing task to detect a second error in the second zone of the computing device.

2. The non-transitory computer-readable medium of claim 1, wherein the temperature differential comprises a lower temperature in the first zone and a higher temperature in the second zone.

3. The non-transitory computer-readable medium of claim 1, wherein performing the at least one processing task comprises performing at least one stress-inducing task among processing tasks, memory tasks, or data storage tasks.

4. A system, comprising:
    a computing device;
    a cooling system that draws heat away from the computing device, the cooling system comprising a plurality of fans; and
    a management controller configured to:

sense a temperature in the computing device;
compare the temperature in the computing device against a temperature profile for testing the computing device, the temperature profile comprising a plurality of profile steps, at least one of the plurality of profile steps specifying a target temperature over a duration of time;
adjust a fan speed of at least one fan among the plurality of fans of the cooling system in an effort to meet the target temperature based at least in part on a difference between the temperature in the computing device and the temperature profile for the computing device;
monitor operation of the computing device to detect a first error in a first zone of the computing device;
adjust a fan speed of at least one other fan among the plurality of fans of the computing system to create a temperature differential between the first zone of the computing device and a second zone of the computing device; and
monitor operation of the computing device to detect a second error in the second zone of the computing device.

5. The system of claim 4, wherein the plurality of fans are located in a plurality of respective zones in the computing device.

6. The system of claim 4, wherein at least two of the plurality of profile steps respectively specify different target temperatures over different durations of time.

7. The system of claim 4, wherein at least one of the plurality of profile steps specifies a temperature ramp over a first duration of time and at least another one of the plurality of profile steps specifies a temperature jump over a second duration of time.

8. The system of claim 4, wherein the management controller is further configured to at least one of:
decrease the fan speed of the at least one fan in response to the temperature being lower than the target temperature in the temperature profile; and
increase the fan speed of the at least one fan in response to the temperature being higher than the target temperature.

9. The system of claim 4, wherein the management controller is further configured to:
determine whether a profile step in the temperature profile is complete; and
proceed to a next profile step in the temperature profile based at least in part on a determination that the profile step is complete.

10. The system of claim 4, wherein at least one of the computing device or the management controller is further configured to:
perform at least one processing task in the computing device;
monitor operation of the computing device while performing the at least one processing task to detect the first error in the first zone of the computing device; and
in response to detection of the first error in the first zone of the computing device, record the first error and an operating profile associated with the computing device for the first error.

11. The system of claim 10, wherein the at least one processing task comprises at least one stress-inducing task among processing tasks, memory tasks, data storage tasks, or input/output tasks.

12. The system of claim 10, wherein, in response to detection of the first error in the first zone of the computing device, at least one of the computing device or the management controller is further configured to:
adapt at least one processing task in the computing device; and
monitor operation of the computing device to detect the second error in the second zone of the computing device.

13. The system of claim 10, wherein, in response to detection of the first error in the first zone of the computing device, the management controller is further configured to:
set a first fan among the plurality of fans for the first zone of the cooling system to a first fan speed and set a second fan among the plurality of fans for the second zone of the cooling system to a second fan speed to form the temperature differential between the first zone and the second zone of the computing device, the temperature differential comprising a lower temperature in the first zone and a higher temperature in the second zone;
adapt at least one processing task in the computing device; and
monitor operation of the computing device to detect the second error in the second zone of the computing device.

14. A method, comprising:
sensing, at least in part by a controller in a computing device, a temperature in the computing device using a temperature sensor;
comparing, at least in part by the controller in the computing device, the temperature in the computing device against a target temperature in a temperature profile for the computing device, the temperature profile comprising a plurality of profile steps, at least one of the plurality of profile steps specifying the target temperature over a duration of time;
adjusting, at least in part by the controller in the computing device, a cooling capacity of a cooling system for the computing device in an effort to meet the target temperature based at least in part on the comparing, the cooling system comprising a plurality of fans;
monitoring, at least in part by the controller in the computing device, operation of the computing device to detect a first error in a first zone of the computing device;
adjusting, at least in part by the controller in the computing device, a fan speed of at least one other fan among the plurality of fans of the computing system to create a temperature differential between the first zone of the computing device and a second zone of the computing device; and
monitoring, at least in part by the controller in the computing device, operation of the computing device to detect a second error in the second zone of the computing device.

15. The method of claim 14, wherein the plurality of are fans located in a plurality of respective zones in the computing device.

16. The method of claim 14, wherein at least two of the plurality of profile steps respectively specify different target temperatures over different durations of time.

17. The method of claim 14, further comprising at least one of:
decreasing, at least in part by the controller in the computing device, the cooling capacity of the cooling system in response to the temperature being lower than the target temperature in the temperature profile; and increasing, at least in part by the controller in the computing device, the cooling capacity of the cooling system in response to the temperature being higher than the target temperature.

18. The method of claim 14, further comprising:
determining, at least in part by the controller in the computing device, whether a profile step in the temperature profile is complete; and
proceeding, at least in part by the controller in the computing device, to a next profile step in the temperature profile based at least in part on a determination that the profile step is complete.

19. The method of claim 14, further comprising:
performing at least one processing task in the computing device;
monitoring, at least in part by the controller in the computing device, operation of the computing device to detect the first error in the first zone of the computing device; and
in response to detection of the first error in the first zone of the computing device, recording, by the controller in the computing device, the first error and an operating profile associated with the computing device for the first error,
wherein the at least one processing task comprises at least one stress-inducing task among processing tasks, memory tasks, data storage tasks, or input/output tasks.

20. The method of claim 19, further comprising, in response to detection of the first error in the first zone of the computing device:
adapting, at least in part by the controller in the computing device, at least one processing task in the computing device; and
monitoring, at least in part by the controller in the computing device, operation of the computing device to detect the second error in the second zone of the computing device.

21. A system, comprising:
a baseboard management controller configured to:
sense a temperature in an electronic device;
compare the temperature against a temperature profile for testing the electronic device, the temperature profile comprising a plurality of profile steps, at least one of the plurality of profile steps specifying a target temperature over a duration of time; and
adjust a cooling capacity of a cooling device in an effort to meet the target temperature based at least in part on a difference between the temperature in the electronic device and the temperature profile;
monitor operation of the electronic device to detect a first error in a first zone of the electronic device;
adjust a cooling capacity of the cooling device to create a temperature differential between the first zone of the electronic device and a second zone of the electronic device; and
monitor operation of the electronic device to detect a second error in the second zone of the electronic device.

22. The system of claim 21, wherein the cooling device comprises a plurality of fans located in a plurality of respective zones in the electronic device.

23. The system of claim 21, wherein at least two of the plurality of profile steps respectively specify different target temperatures over different durations of time.

24. The system of claim 21, wherein the baseboard management controller is further configured to:
decrease the cooling capacity of the cooling device in response to the temperature being lower than the target temperature in the temperature profile; and
increase the cooling capacity of the cooling device in response to the temperature being higher than the target temperature.

25. The system of claim 21, wherein the baseboard management controller is further configured to:
determine whether a profile step in the temperature profile is complete; and
proceed to a next profile step in the temperature profile based at least in part on a determination that the profile step is complete.

* * * * *